United States Patent [19]

Scaramucci

[11] Patent Number: 4,860,789

[45] Date of Patent: Aug. 29, 1989

[54] SWING CHECK VALVE WITH HINGE PIN INSERT

[76] Inventor: John P. Scaramucci, 10724 Woodridden, Oklahoma City, Okla. 73170

[21] Appl. No.: 247,885

[22] Filed: Sep. 22, 1988

Related U.S. Application Data

[63] Continuation of Ser. No. 78,410, Jul. 27, 1987, abandoned.

[51] Int. Cl.⁴ ............................................. F16K 15/03
[52] U.S. Cl. .............................. 137/515.7; 137/527.4; 137/527.8
[58] Field of Search .................. 137/515.7, 527, 527.4, 137/527.8

[56] References Cited

U.S. PATENT DOCUMENTS

| 3,720,228 | 3/1973 | Wheatley | 137/515.7 |
| 3,817,277 | 6/1974 | Wheatley | 137/527.8 |
| 3,933,173 | 1/1976 | Kajita | 137/527.8 |
| 3,934,608 | 1/1976 | Guyton | 137/527.8 |
| 4,201,241 | 5/1980 | Schertler | 137/527 |

FOREIGN PATENT DOCUMENTS 2079406  1/1982  United Kingdom ............ 137/527.8

Primary Examiner—Robert G. Nilson
Attorney, Agent, or Firm—Dunlap, Codding, Peterson & Lee

[57] ABSTRACT

A swing check valve where the hinge pin of the disc is supported by an insert separate from the valve seat and/or valve cage. The hinge pin insert is readily replaceable.

14 Claims, 4 Drawing Sheets

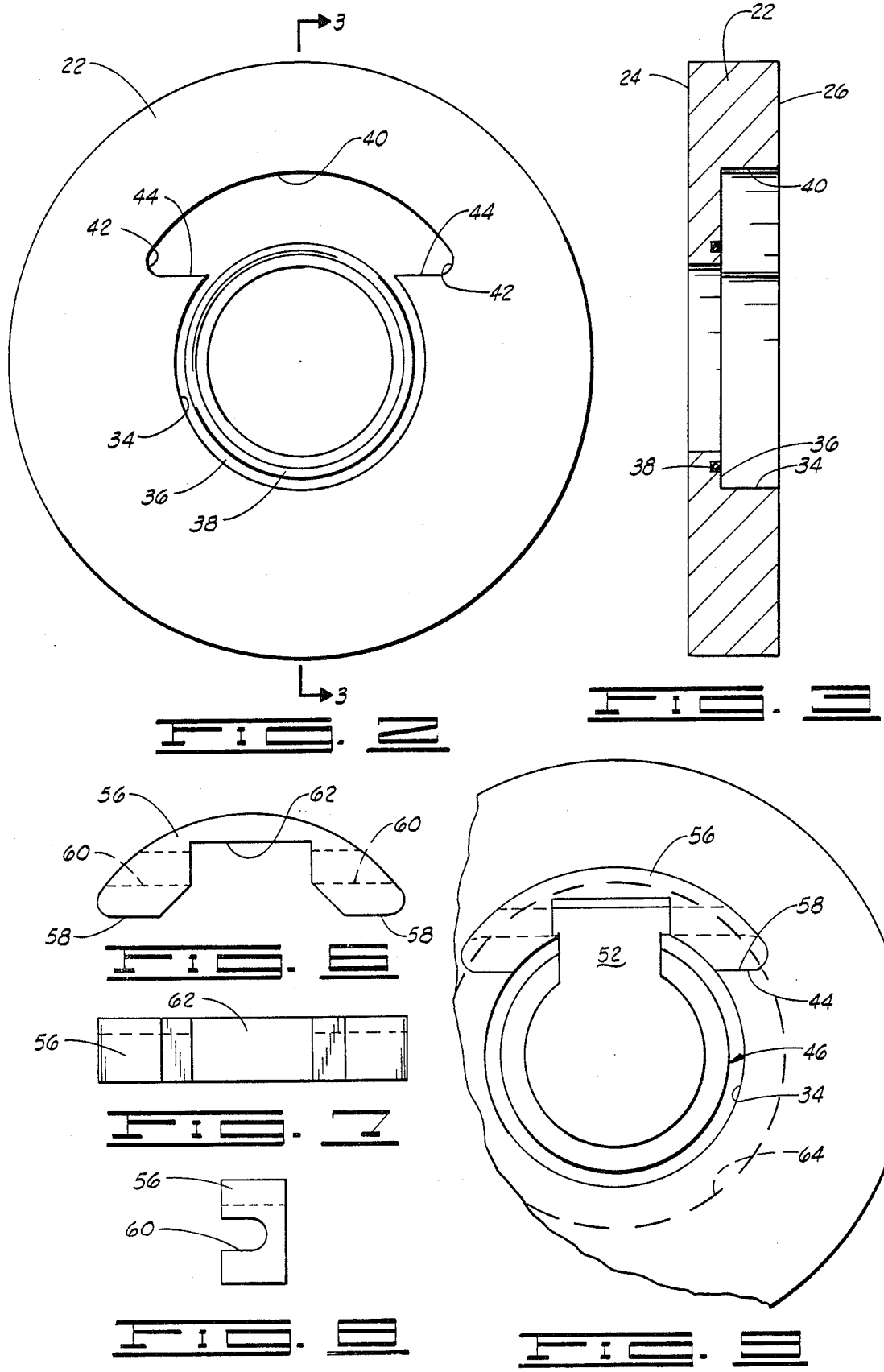

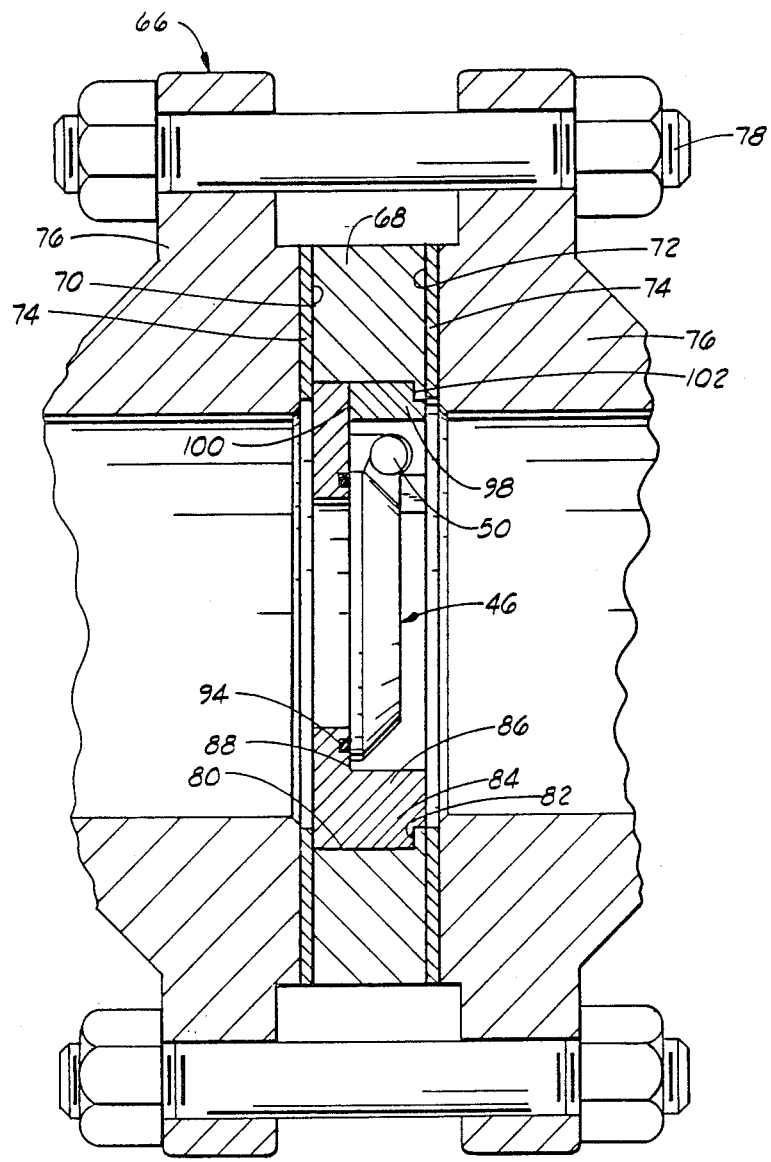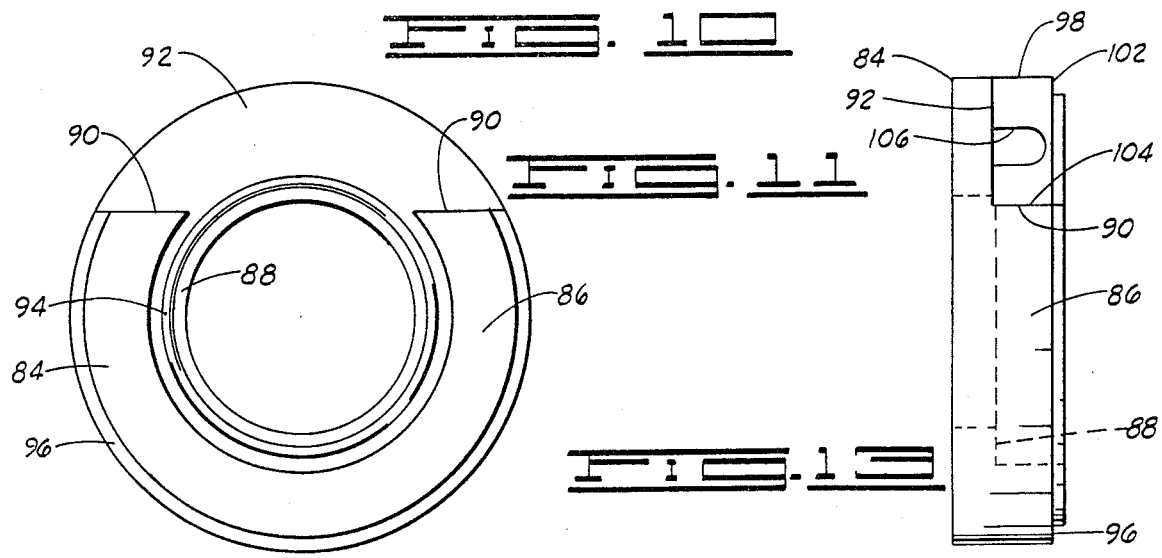

4,860,789

SWING CHECK VALVE WITH HINGE PIN INSERT

This is a continuation of co-pending application Ser. No. 078,410 filed on July 27, 1987, now abandoned

BRIEF SUMMARY OF THE INVENTION

1. Field of the Invention

This invention relates to improvements in swing check valves.

2. Background of the Invention

Swing check valves conventionally have a hinge pin supporting the disc or clapper, by means of which the disc or clapper swings between its open and closed positions. It is common practice for the hinge pin to be journalled in a hinge pin recess, where the hinge pin recess is formed in the valve body or in a member which forms a cage partially surrounding the disc. In some service conditions, the hinge pin and hinge pin recess become worn. When this occurs, the member containing the hinge pin recess must be replaced which, conventionally, means either the valve body or a member forming the cage must be totally replaced.

BRIEF DESCRIPTION OF THE DRAWINGS

FIG. 2 is an end view of the body of the valve shown in FIG. 1 looking at the right hand end of the body as viewed in FIG. 1.

FIG. 3 is a cross sectional view taken along lines 3—3 of FIG. 2.

FIG. 6 is an elevational view of the hinge pin insert employed in the valve of FIG. 1.

FIG. 7 is a bottom view of the hinge pin insert.

FIG. 8 is another elevational view of the hinge pin insert taken at 90° from the view shown in FIG. 6.

FIG. 9 is an end view of the valve of FIG. 1 looking at the right hand end of the valve with the valve assembled and with the inner edge of the adjacent pipe flange gasket shown in dashed lines.

FIG. 10 is a cross sectional view through another form of wafer-type check valve installed between pipe flanges and constructed pursuant to this invention.

FIG. 11 is an elevational view of the combination seat and cage of the valve shown in FIG. 10 looking at the right hand end of the combination seat and cage as viewed in FIG. 10.

FIG. 13 is a side elevational view of the combination seat and cage of the valve of FIG. 10 with the hinge pin insert associated therewith.

DETAILED DESCRIPTION OF THE DRAWINGS

Figure 1:
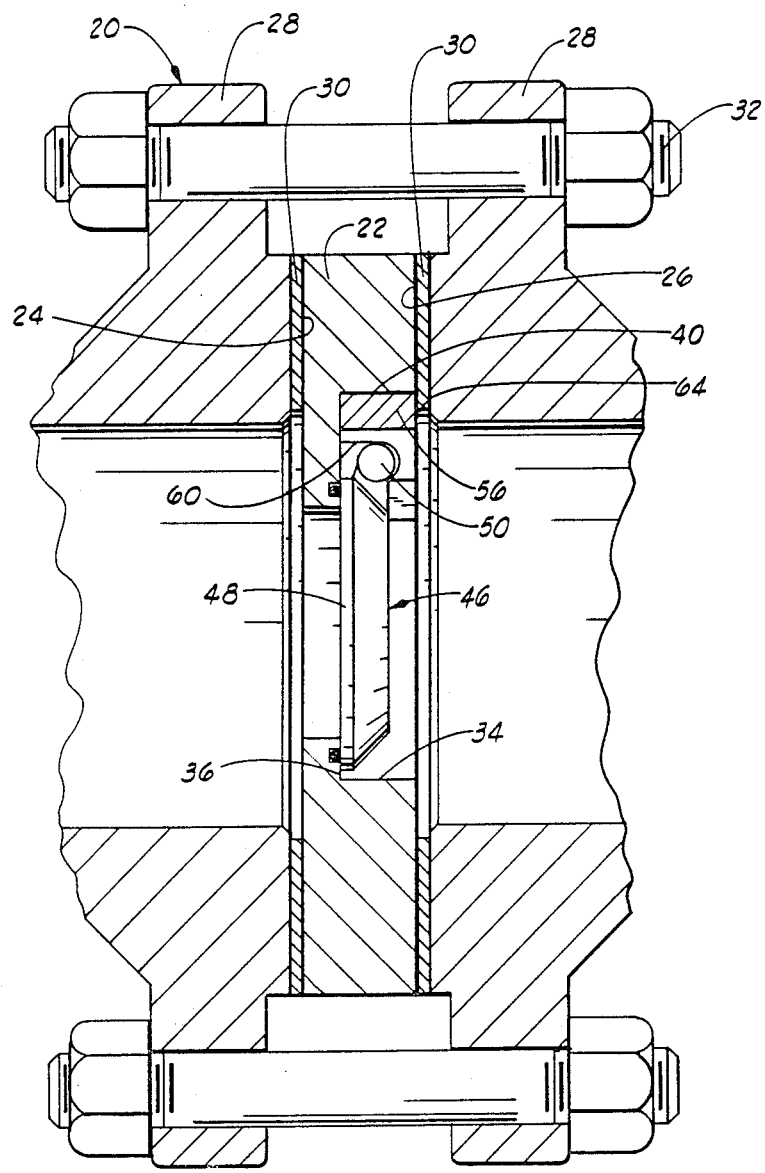
FIG. 1 is a cross sectional view through a wafer-type check valve installed between pipe flanges and constructed pursuant to this invention.

Referring to the drawings in detail, and particularly FIG. 1, reference character 20 generally designates a valve constructed pursuant to this invention. The valve 20 basically comprises a tubular valve body 22 having planar ends 24 and 26 for installation between conventional pipe flanges 28, with a conventional gasket 30 between each end of the valve body and the respective pipe flange. The pipe flanges, and hence the valve 20, are maintained in assembled relation by conventional bolts 32.

As shown more clearly in FIGS. 2 and 3, the valve body 22 has a counterbore 34 extending from the end 26 of the body which forms an annular valve seat 36 at the end of the counterbore. A suitable sealing ring 38 is positioned in a mating groove in the valve seat 36 for purposes to be described. An arcuate recess 40 is also formed in the end 26 of the valve body 22 in communication with a portion of the counterbore 34. The depth of the recess 40 corresponds to the depth of the counterbore 34. Also, it will be observed that the opposite ends 42 of the recess 40 extend radially outward of the counterbore 34 to provide shoulders 44. The walls of the counterbore 34 form what is conventionally considered a valve cage, and with the arrangement shown, the shoulders 44 form ends of the valve cage.

Figures 4, 5:
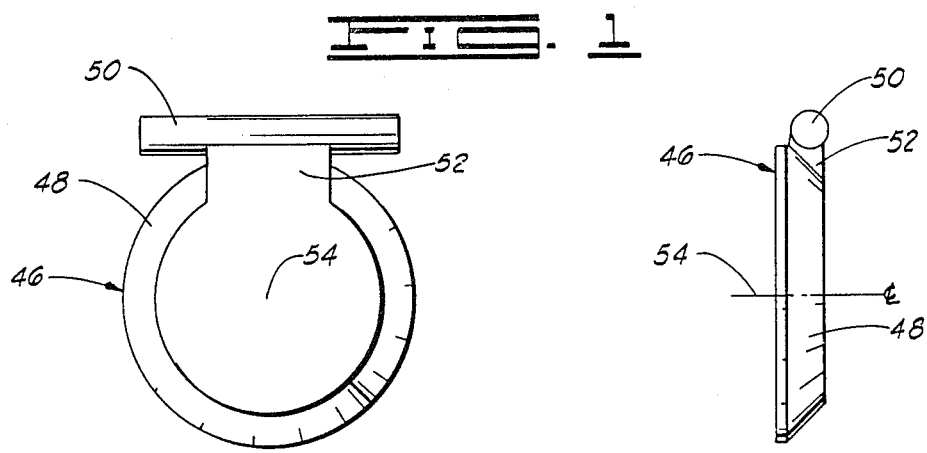
FIG. 4 is an elevational view of the disc of the valve shown in FIG. 1.
FIG. 5 is another elevational view of the disc taken at 90° from the view shown in FIG. 4.

The valve 20 also includes a valve disc generally designated by reference character 46 and shown in FIGS. 1, 4 and 5. The disc 46 has a substantially flat, round main body portion 48 and a hinge pin 50 formed integrally therewith. A substantially rectangular transition 52 extends between the main body portion 48 and the hinge pin 50, such that the opposite end portions of the hinge pin 50 project from the opposite sides of the transition 52. As will also be observed, the hinge pin 50 is positioned in a plane extending at right angles to the centerline 54 of the main body portion of the disc. The main body portion 48 of the disc is sized to mate with the valve seat 36 when the valve 20 is closed.

A hinge pin insert 56, shown in FIGS. 1, 6, 7 and 8 is also employed in the valve 20. The hinge pin insert 56 is shaped to fit in the recess 40 in the valve body, and has opposite ends 58 sized and arranged to mate with the shoulders 44 when the valve is assembled. A pair of hinge pin recesses 60 are formed in the hinge pin insert 56 to receive the opposite end portions of the hinge pin 50. The depth of each hinge pin recess 60 is greater than the diameter of the hinge pin 50, such that the disc 46 can "float" a limited distance to and from the seat 36 during the opening and closing movements of the valve. It will also be observed in FIG. 1 that the hinge pin recesses 60 face the valve seat 36, such that when the hinge pin 50 is installed therein and the valve is assembled, the bottom of the recess 40 will trap the hinge pin 50 in the hinge pin recesses. It will also be observed in FIGS. 6 and 7 that a substantially rectangular opening 62 is provided in the central portion of the insert 56 to encircle the transition 52 of the disc and the mating portions of the hinge pin 50 when the disc 46 is closed. It will be observed that the insert 56 is in the same plane as the walls of the counterbore 34 forming the cage of the valve, and the walls 34 of the counterbore encircle the main body portion 48 of the disc. Thus, the disc 46 can swing in a counterclockwise direction from the closed position shown in FIG. 1 through an arc of approximately 90° into the adjacent pipe flange 28.

As shown in FIGS. 1 and 9, the inner edge 64 of the pipe flange gasket 30 at the end 26 of the valve body overlaps the adjacent end of the insert 56. As a result, the respective gasket and pipe flange 28 hold the insert 56 in operating position in the recess 40 when the valve is assembled.

In the event of wear of the walls of the hinge pin recesses 60, the insert 56 may be easily replaced by disassembling the valve 20. Similarly, in the event of wear of the disc 46 and particularly the hinge pin 50, the entire disc 46 can also be easily replaced. In both instances, no replacement of the valve body or other supporting structure is required.

The embodiment of swing check valve illustrated in FIG. 10 has been designated by reference character 66. The valve 66 basically comprises a tubular valve body 68 having planar ends 70 and 72 mating with conventional gaskets 74 and pipe flanges 76. The valve is held in assembled relation by conventional bolts 78 interconnecting the pipe flanges 76. A counterbore 80 extends through the major portion of the length of the valve body 68 from the end 70 and forms an annular shoulder 82 in the valve body. The counterbore 80 is sized to receive a generally ring shaped member 84.

The member 84 is illustrated in FIGS. 10, 11 and 13 and forms a combination cage 86 and annular valve seat 88 for the disc 46. As shown in FIGS. 10 and 13, the cage portion 86 extends around more than one half of the main body portion of the disc 46 and is provided with free ends 90. The wall of the member 84 forming the valve seat 88 is extended beyond the free ends 90 of the cage portion 86 to form a wall 92 coterminous with the valve seat 88. It will also be observed in FIGS. 10 and 13 that a suitable sealing ring 94 is provided in a mating groove in the valve seat 88 to mate with the disc 46 when the valve is closed. Further, an annular shoulder 96 is formed around the outer periphery of the member 84 to engage the end 82 of the counterbore 80 and properly position the member 84 in the valve body. As shown, the thickness of the member 84 corresponds to the thickness of the valve body 68 except in that area of the member 84 between the free ends 90 of the cage portion 86.

A hinge pin insert 98 is positioned on the free ends 90 of the cage portion 86 and, thus, in the same plane as the cage portion 86. The insert 98 has a curved outer periphery conforming to the outer periphery of the wall portion 92 of the member 84, and the inner face 100 of the insert 98 is flat to mate with the wall 92. The opposite end face of the insert 98 is provided with a radially extending shoulder 102 which mates with the end 82 of the body counterbore 80, such that the hinge pin insert 98 will be held in operating position when the valve is assembled. The opposite ends 104 of the insert 98 rest on the free ends 90 of the cage portion 86.

Figure 12:
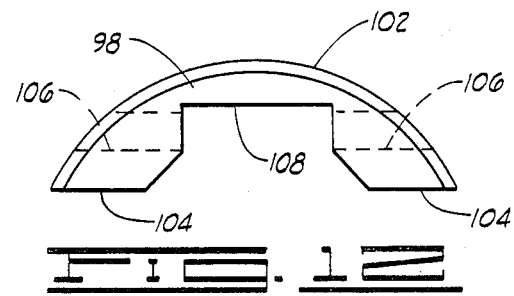
FIG. 12 is an elevational view of the hinge pin insert employed in the valve of FIG. 10.
Figure 16:
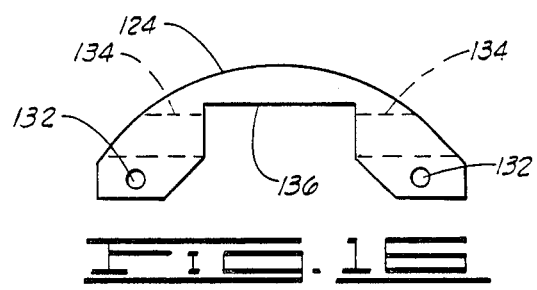
FIG. 16 is an elevational view of the hinge pin insert shown in FIGS. 14 and 15.
Figure 17:
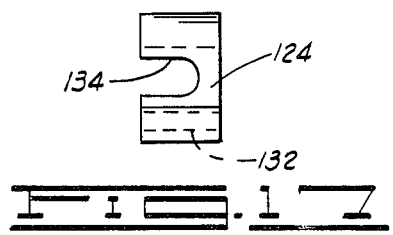
FIG. 17 is an elevational view of the hinge pin insert of FIG. 16 looking at one end of the insert.
Figure 14:
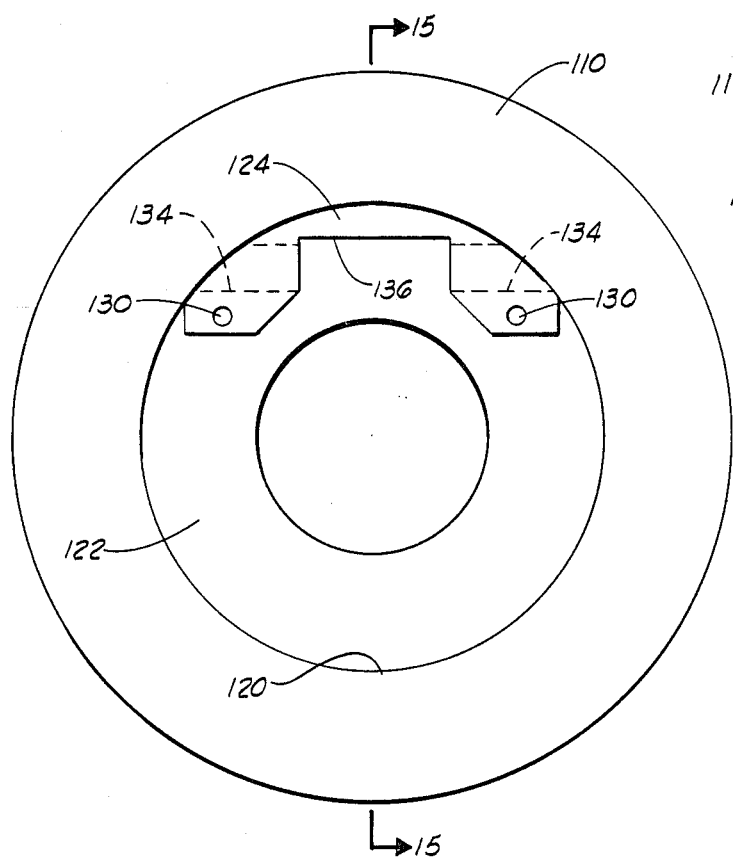
FIG. 14 is an elevational view of another form of valve body which may be used in a valve of this invention, with the hinge pin insert secured therein.

As shown in FIGS. 10, 12 and 13, the insert 98 is also provided with a pair of hinge pin recesses 106 facing the wall 92, and hence the valve seat 88. Each hinge pin recess 106 is of a depth greater than the diameter of the hinge pin 50 of the disc 46, such that the disc 46 can "float" a limited distance to and from the valve seat 88, yet the hinge pin 50 will be trapped in the hinge pin recesses 106 by the wall 92. As shown in FIG. 12, the central portion of the insert 98 has a substantially rectangular opening 108 therein between the hinge pin recesses 106 sized to encircle the trnasition 52 of the disc 46, as well as that portion of the hinge pin 50 in line with the transition 52, such that the disc 46 can swing freely through the insert 98, as well as the cage 86, from the closed position shown in FIG. 10, counterclockwise through an arc of approximately 90°.

As in the preceding embodiment, the insert 98 can be readily replaced in the event of wear of the walls of the hinge pin recesses 106 without replacing any other portion of the valve. Similarly, the disc 46 can be easily replaced in the event of wear of the disc, including the hinge pin 50.

Figure 15:
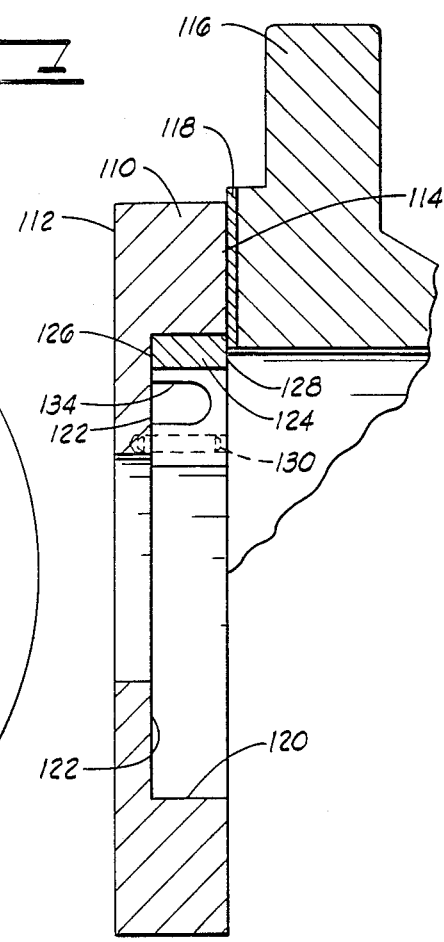
FIG. 15 is a cross sectional view taken along lines 15—15 of FIG. 14.

Another form of valve constructed pursuant to this invention is partially illustrated in FIGS. 14 through 17. This embodiment employs a tubular valve body 110 having planar ends 112 and 114, for mating between conventional pipe flanges 116 and pipe flange gaskets 118, one of each of which is shown in FIG. 15. A counterbore 120 is formed through the major portion of the thickness of the body 110 from the end 114 and provides an annular wall 122 in the valve body which, among other things, can form a valve seat. The walls of the counterbore 120, in part, form a cage for the disc of a valve, similar to that previously described.

A hinge pin insert 124 is positioned in one section of the counterbore 120. The outer periphery of the insert 124 is shaped to conform to the adjacent wall of the counterbore 120, and one end face 126 of the insert 124 is flat to mate with the adjacent wall 122 of the body. The thickness of the insert 124 corresponds to the depth of the counterbore 120, such that the opposite end 128 of the insert will be engaged by the inner peripheral portion of the adjacent pipe flange gasket 114, such that the gasket 114 and cooperating pipe flange 116 will retain the insert 124 in operating position in the valve body. Also, the insert may be secured in the valve body 110 by a pair of pins 130 extending through mating holes 132 in the insert 124 and body 110. The pins 130 function in the nature of dowel pins to properly position the insert 124.

The insert 124 is also provided with a pair of hinge pin recesses 134 facing the wall 122, such that the opposite end portions of the hinge pin of a disc may be journalled therein and will be trapped by the wall 122 when the valve is fully assembled. Also, a substantially rectangular opening 136 is provided in the central portion of the insert 124 between the hinge pin recesses 134 to receive the transition portion of a disc, such that the disc can swing through the insert in the same manner as previously described with the previous embodiments. It will also be observed that, as in the preceding embodiments, the insert 124 may be easily replaced in the event of wear of the walls of the hinge pin recesses 134, without replacing any other portion of the valve.

Changes may be made in the combination and arrangement of parts of elements as heretofore set forth in the specification and shown in the drawings without departing from the spirit and scope of the invention as defined in the following claims.

What is claimed is:

1. A valve, comprising:
    a tubular body;
    an annular seat in the body;
    a disc in the body having a substantially round, flat main body portion sized to mate with the seat when the valve is closed, and having a hinge pin thereon extending in a plane at a right angle to the longitudinal axis of the main body portion;
    a cage in the body surrounding a portion of the periphery of the disc when the disc is closed;

an insert removably supported in the body in the plane of the cage, said insert having at least one hinge pin recess therein sized to receive the hinge pin and support the disc in the cage when the disc is closed and for supporting the disc for swinging movement between open and closed positions; and said insert encircling less than one-half the periphery of the disc when the disc is closed.

2. A valve as defined in claim 1 wherein the hinge pin recess faces the valve seat.

3. A valve as defined in claim 1 wherein the cage has opposite ends, the insert has opposite ends, and the opposite ends of the insert mate with the opposite ends of the cage.

4. A valve as defined in claim 1 wherein the cage is formed in the body and the body has a recess therein interrupting the cage, and wherein the insert is positioned in said recess in the body.

5. A valve as defined in claim 1 wherein the disc includes a transition between the main body portion and the central portion of the hinge pin, and wherein the insert has a recess therein between a pair of hinge pin recesses sized to recieve said transition.

6. A valve as defined in claim 1 wherein the seat and cage are part of a member separate from the body positioned in the body.

7. A valve as defined in claim 6 wherein the cage portion of said member is in the form of an interrupted ring having free ends, the insert has opposite ends, and wherein the opposite ends of the insert engage the free ends of said cage portion.

8. A valve as defined in claim 1 wherein the cage is a part of a counterbore in the valve body, and the insert is secured in said counterbore.

9. A valve for use between pipe flanges with a gasket between each flange and the adjacent end of the valve, comprising:

a tubular body having planar ends to mate with the gaskets;

an annular seat in the body;

a disc in the body having a substantially round, flat main body portion sized to mate with the seat when the valve is closed, and having a hinge pin thereon extending in a plane at a right angle to the longitudinal axis of the main body portion;

a cage in the body surrounding over one-half of the periphery of the disc when the disc is closed; and an insert removably supported in the body in the plane of the cage against one of said gaskets, said insert having at least one hinge pin recess therein to receive the hinge pin and support the disc in the cage when the disc is closed and for swinging movement between open and closed positions.

10. A valve as defined in claim 9 wherein the cage is formed in the body extending from opposite ends of a recess in one end of the body, and wherein the insert is shaped to fit in said recess in the body.

11. A valve as defined in claim 9 wherein the body has a counterbore extending from one end thereof, the seat and cage are formed as a part of a member separate from the body fitting in said counterbore and having an annular shoulder on the outer periphery thereof sized to engage the end of the counterbore.

12. A valve as defined in claim 11 wherein the cage portion of said member is in the form of an interrupted ring having free ends, the insert has opposite ends and a radial shoulder on the outer periphery thereof, and wherein the opposite ends of the insert engage the free ends of said ring, and said radial shoulder on the insert engages the end of said counterbore.

13. A valve as defined in claim 9 wherein the hinge pin recess faces the valve seat.

14. A valve as defined in claim 9 wherein the cage is a part of a counterbore in one end of the valve body, and wherein the insert is secured in said counterbore in a position to be engaged by the respective gasket when the valve is assembled between pipe flanges.

* * * * *